United States Patent [19]
Feldman

[11] 3,862,880
[45] Jan. 28, 1975

[54] LAMINATE FOR REFRIGERATION APPARATUS, REFRIGERATOR AND METHOD OF FORMING SAME

[75] Inventor: Peter Blandford Feldman, St. Denys-Westrem, Belgium

[73] Assignee: SIDAPLAX, Gentbrugge, Belgium

[22] Filed: Aug. 10, 1973

[21] Appl. No.: 387,294

[30] Foreign Application Priority Data
Aug. 21, 1972 Great Britain .................... 38944/72

[52] U.S. Cl. ................. 161/160, 156/229, 156/309, 161/190, 161/242, 161/256, 161/402
[51] Int. Cl. ............................................. B32b 5/18
[58] Field of Search ........... 161/161, 160, 256, 402, 161/242, 243, 190; 156/229, 309

[56] References Cited
UNITED STATES PATENTS

| | | | |
|---|---|---|---|
| 3,463,687 | 8/1969 | Folsom.......................... | 161/161 UX |
| 3,563,845 | 2/1971 | Stevens............................... | 161/160 |
| 3,682,768 | 8/1972 | Adams et al........................ | 161/256 |

*Primary Examiner*—William J. Van Balen
*Attorney, Agent, or Firm*—Michael J. Murphy

[57] ABSTRACT

A laminate especially useful in refrigeration applications which includes a sheet of rubber-modified polystyrene, a film of rubber-modified copolymer of styrene and acrylonitrile acting as a buffer and in contact with a sheet of polyurethane foam. A refrigeration cabinet and method of forming same utilizing such laminate are likewise disclosed.

2 Claims, 4 Drawing Figures

PATENTED JAN 28 1975

LAMINATE FOR REFRIGERATION APPARATUS, REFRIGERATOR AND METHOD OF FORMING SAME

This invention relates to new and useful laminates.

Rubber-modified polystyrenes have been extensively used to produce thermoformed articles since they have good toughness, good resistance to impact, adequate stiffness, adequate flex fatigue resistance, good processibility and are competitive in price. However their usefulness can be limited by their low resistance to certain organic solvents such as ketones, ester, some hydrocarbons and some halogenated hydrocarbons. This relative lack of resistance to organic solvents prevents the production of good quality rubber-modified polystyrene-polyurethane foam laminates, because commercial foamable polyurethane compositions can contain halogenated aliphatic or cycloaliphatic hydrocarbons as the blowing agent. This is a severe limitation since halogenated aliphatic or cycloaliphatic hydrocarbons such as trichlorofluoromethane, dichlorodifluoromethane, 1,1,2-trichloro-1,2,2-trifluoroethane and mixtures thereof have established themselves as the blowing agents of choice for many polyurethane foams.

In order to overcome this problem there is a need for a sheet material that has most of the properties of a rubber-modified polystyrene and that forms a strong bond with polyurethane foam when a halogenated aliphatic or cycloaliphatic hydrocarbon is used as the blowing agent. Such a sheet material would be useful in the production of refrigerator cabinets, refrigerator doors and thermally insulating panels.

The laminate of the present invention which satisfies this need comprises a sheet of a rubber-modified polystyrene and a film of rubber-modified copolymer of styrene and acrylonitrile.

The rubber-modified polystyrene is a polymer produced by the polymerisation of styrene that has been modified by the incorporation, during or after polymerisation, of a natural or synthetic rubber. The most preferred method of incorporating the rubber is by the formation of a polymer mix comprising styrene and the rubber, the mix being subsequently polymerised to give a polymeric product containing a graft copolymer of the rubber and styrene.

Generally the amount of rubber, combined or otherwise, in the modified polystyrene is from 2 to 20 percent by weight but the especially preferred range is from 2.5 to 10 percent by weight for example from 3 to 4 percent by weight.

The rubber-modified copolymer of styrene and acrylonitrile (often known as an ABS polymer) is polymer of styrene and acrylonitrile that has been modified by the incorporation during or after polymerisation, of a natural or synthetic rubber. The most preferred method of incorporating the rubber is by the formation of a polymer mix comprising the styrene, acrylonitrile and rubber, the mix being subsequently polymerised to give a polymeric product containing a graft polymer of the rubber and a copolymer of styrene and acrylonitrile.

The rubber-modified copolymer of styrene and acrylonitrile preferably contains at least 1 percent by weight of units derived from acrylonitrile and at least 50 percent by weight of units derived from styrene. Preferably the ratio of the units derived from styrene to the units derived from acrylonitrile is within the range 85:15 to 60:40 by weight, more especially from 80:20 to 65:35 by weight. Preferably the rubber content is from 1 to 40 percent by weight and is preferably less than 30 percent by weight such as from 5 to 15 percent by weight more especially from 9 to 13 percent by weight.

The synthetic rubber can be the polymerised product of a conjugated diene monomer such as butadiene, isoprene, 2,3-dimethylbutadiene, 1-phenylbutadiene, myrcene and mixtures of such monomers, stereoregular polybutadienes e.g., 1,4-polybutadiene having a cis content of at least 25 percent and 1,2-addition content of not more than 10 percent, styrenebutadiene copolymers such as GRS rubber, or a mixture of any two or more of these rubbers. The especially preferred rubber is polybutadiene.

The rubber-modified polystyrene and in the rubber modified copolymer of styrene and acrylonitrile can contain units of a substituted styrene or of an alkyl-substituted acrylonitrile in addition to or instead of styrene or acrylonitrile respectively.

When units of a substituted styrene or units of an alkyl-substituted acrylonitrile are present in the laminate of the invention then the reference above to "units of styrene" means "the total units of styrene and substituted styrene" and the reference above to "units of acrylonitrile" means "the total units of acrylonitrile and alkyl-substituted acrylonitrile". Examples of substituted styrenes are ar-alkyl styrenes, such as o-, m- or p-methylstyrene, 2,4-dimethylstyrene, ar-ethylstyrene, p-isopropylstyrene, p-t-butylstyrene, a-alkylstyrenes, such as α-methylstyrene, α-ethylstyrene and α-methyl-p-methylstyrene; halostyrenes such as o- and p-chlorostyrene, p-bromostyrene, p-fluorostyrene, 2,4-dichlorostyrene and 2,4-difluorostyrene and examples of alkyl-substituted acrylonitriles are methacrylonitrile, ethacrylonitrile, propacrylonitrile and butacrylonitrile.

The preferred rubber-modified copolymer of styrene and acrylonitrile is an acrylonitrile-butadiene-styrene (ABS) copolymer and the preferred rubber-modified polystyrene is polybutadiene-modified polystyrene.

The components of the laminate can be bonded together by any convenient method. The method will depend on whether or not a laminate is required with weak or a strong bond.

The sheet and the film may be caused to adhere weakly to each other by bringing them into contact and subjecting them to suitable conditions of heat and pressure such as from 60° to 80°C. and from 1 to 3 pounds per square inch or electrostatic attraction or by a combination of both.

For strongly bonded laminates the sheet and the film are brough into contact and subjected to somewhat higher temperatures and pressures. Thus in general the surface of the sheet and the film are heat softened and pressed together and temperatures of from 80° to 160°C., preferably from 90° to 150°C. and pressures of from 1 to 10 pounds per square inch preferably from 3 to 8 pounds per square inch are suitable. The temperature and the pressure, the tension in the layers and the duration of the contact with various rollers need to be chosen by means of experimentation. They depend on the nature, thickness and heat capacity of the layers. However, as an example, when employing a non-oriented polybutadiene-modified polystyrene sheet having a thickness of 5000 microns and a biaxially oriented ABS film having a thickness of 50 microns the sheet has surface temperature of from 130° to 160°C. and the film has a temperature of from 90° to 105°C., the sheet and the film are submitted to a pressure of from 1 to 10 pounds per square inch.

The sheet can be laminated to the film immediately after the sheet has been extruded by an in-line extrusion-laminating process or immediately after both the sheet and the film have been extruded by a co-extrusion-laminating process.

We have found that a strong bond is produced if a surface of either the sheet or the film or both is subjected to an electric discharge before it is brought into contact and subjected to heat and pressure.

The electric discharge applied will normally be one of a high voltage, especially for instance above 3,000 volts, and particularly from 4,000 to 30,000 volts. From 7,500 to 15,000 volts is usually suitable. The voltage is preferably an alternating one, especially one having a frequency of from 1,000 to 100,000 cycles per second. The discharge is preferably a corona discharge, but can be in the form of a spark or spray discharge.

The discharge is applied between suitable electrodes, placed on either side of the sheet or film. The first electrode is preferably in contact with the surface that is form the outer surface of the laminate and the second electrode is spaced from the surface that is to be bonded. It is often convenient to use a metal roller as the first electrode.

The distance of the second electrode from the resin surface is chosen so that it is close enough for the discharge to take place, but far enough away for the effect on the surface to be even. Generally from 0.1 mm to 1.5 mm and especially from 0.8 mm to 1.2 mm is a suitable distance.

The time during which the electric discharge is allowed to act upon the sheet or film depends on several factors, including for example the voltage of the discharge and the proximity of the electrode to the surface but in general it will be found that if the discharge is allowed to act for 0.003 to 1 second, and especially for from 0.01 to 0.5 second, the results of the treatment will be satisfactory.

The treatment is preferably carried out immediately before the sheet and film are subjected to heat and pressure but can also be carried out at any time before the sheet and film are laminated, for example up to one month or up to one year or two years before they are laminated. Although we prefer to treat the sheet or film at from 0° to 120°C., for example at room temperature, sheets or films that have a higher temperature e.g., those emerging from an extruder, can also be treated.

A strong bond is also produced if surfaces to be bonded of sheet or film or both are treated with a) a gaseous mixture of boron trifluoride and an oxidising agent, b) flame-treatment, c) a strong oxidant such as nitric acid, d) ultra-violet radiation, e) a photosensitiser such as a ketone, such as benzophenone or acetophenone and then ultra-violet ratiation, f) sand blasting or other roughening treatment or g) treatment with a solvent or etchant followed by complete removal of the solvent or etchant before the layers are laminated.

The components of the laminate can also be bonded together by the application of an adhesive. Where an adhesive is used it is preferably applied in the form of discreet bands. Any suitable adhesive can be used which does not attack the sheet or film. Examples of suitable adhesives are epoxy resins, polyurethanes, a synthetic rubber latex and a copolymer or acrylonitrile and an acrylic ester.

The sheet and the film before and after forming the laminate of the invention can be non-oriented, monooriented or biaxially oriented and the orientation will influence the physical properties of the laminate produced.

To produce a laminate suitable for refrigerator liners and doors and insulating panels that can be vacuum formed and bonded to a polyurethane foam and that is not too expensive we prefer to laminate a biaxially oriented ABS film having a thickness of from 25 to 75 microns to a non-oriented polybutadiene-modified polystyrene sheet that is from 2000 to 6000 microns thick, and we find it convenient to use a sheet that has emerged from the slit die of an extruder while it is still hot. Very suitable biaxially oriented ABS films for the formation of the laminate are the films having the weight composition 10.6 percent butadiene, 22.3 percent acrylonitrile and 67.1 percent styrene and the commerically available film known as BOABS (Registered Trade Mark).

The production of laminates from biaxially oriented films is convenient because there is no problem in keeping the layer flat and wrinkle-free when bringing it into contact with the sheet. This is because when the laminate is formed under heat and pressure, the laminating temperature will generally be one which causes the film to shrink up to 3 percent so the film is flat and taut when it contacts the sheet.

Sheets thinner than 250 microns are sometimes sold under the designation "film" but for the purpose of this specification a film has a thickness of less than 200 microns and a sheet has a thickness of at least 200 microns.

The following Table shows the type of films that are particularly useful in the production of the laminates of the invention.

| Film | Thickness | Unmoulding Stress in Lb/sq.in | |
|---|---|---|---|
| | | Longitudinal | Transverse |
| Biaxially oriented | from 12.5 to 150 microns e.g. from 25 to 75 microns | 25–550 | 25–550 |
| Mono-oriented | from 15 to 175 microns e.g. from 25 to 75 microns | 0–20 or 0–550 | 0–550 or 0–20 |
| Non oriented | between 20 and 200 microns from 25 to 75 microns or from 125 to 175 microns | 0 | 0 |

Sheets having a thickness of from 200 to 8000 microns can be used to produce the laminates of the invention and those having a thickness of from 200 to 500 microns can be biaxially oriented, mono-oriented or non-oriented.

For refrigerator liners and doors and thermally insulating panels a thickness of from 2000 to 6000 microns, preferably from 3000 to 5000 microns is suitable and this is usually non-oriented.

The films and sheets that form the laminate of the invention are preferably made by an extrusion process but can also be made by a casting process. The methods of producing mono-oriented and biaxially oriented films and sheets by stretching a sheet after extrusion are well known in the art.

The exact thickness of the sheet or film depends on the properties required. For many purposes a film having a thickness of from 25 to 50 microns gives sufficient barrier qualities or chemical resistance. However laminates which need greater barrier qualities or greater chemical resistance will require a thicker film for example having a thickness of from 50 to 75 microns or from 75 to 100 microns and such thicker films are also desirable for laminates which are to form very deep drawn formings since the film of rubber-modified copolymer of styrene and acrylonitrile in the laminate can become thin in the areas of maximum stretch after deep drawn forming.

The laminate of the invention can be of any convenient length and width, but is most advantageously between about 30 and about 150 cm. wide, for example from 90 to 120 cm. wide, and between about 1 and 10 metres long. Laminates that have a thickness less than about 750 microns can be rolled.

The laminate can be thermoformed into the desired shape by conventional thermoforming processes such as vacuum forming, pressure forming, sheet blow moulding, mechanical forming and compression moulding and can be used to form shaped articles such as cups, trays, egg cartons, margarine containers and refrigerator liners. We prefer to thermoform a laminate of the invention having its layers strongly bonded together particularly for refrigerator and other large components, but we have found that for other purposes, especially for the production of cups and margarine containers, particularly those having rims or flanges, that a weakly bonded laminate is satisfactory. There is an added advantage that after thermoforming, if necessary the two components of the laminate can be separated for re-working.

The barrier properties of laminates of the invention having a film thickness between 25 and 200 microns and a sheet thickness of from 200 to 500 microns make them useful for the manufacture of containers, lids and other forms of packaging, particularly for food products.

One or both of the surfaces that are bonded in the laminate can bear an embossed, impressed or printed decorative design.

The laminate of the invention is particularly useful for the production of a refrigerator cabinet having a thermally insulating unitary structure in the form of a box having one open side which provides access to the interior of the cabinet the other sides of the box having interior and exterior spaced-apart walls, the interior walls or inner liner being made of the laminate of the invention, with the film facing the exterior walls and the space between the walls being filled with a polyurethane foam and the spaced-apart walls being bonded to the polyurethane foam.

The invention also provides a method of constructing a refrigerator cabinet as defined above which comprises arranging the interior and exterior walls in spaced-apart relationship with the film facing the exterior walls, optionally supporting the walls within a jig, introducing a foamable or foaming polyurethane composition into the space and allowing the composition to set.

The unitary box-like structure may be employed for refrigerator cabinets having a front opening or a top opening, the open side of the box-like structure, which provides the access to the interior, being disposed accordingly.

The exterior walls may be made of metal optionally having decorative or wear resistant material on their external surface. When the exterior walls are made of metal, the walls preferably have an inwardly turned flange which serves to cover or partially cover the forwardly facing edges of the structural unit and serves to support, by means of hinges, an openable door or lid for the cabinet. When the exterior walls are of metal, the interior surface of the external wall is preferably treated so that the polyurethane bonds to it. Suitable treatments include sand blasting, wire brushing or the application of a primer.

The exterior walls may also be made of wood or wood and plastic laminates.

The exterior walls may be made of paper, cardboard or a similar material made from paper pulp. In this case the paper, cardboard or similar material made from paper pulp may be of any convenient quality of suitable strength capable of being folded to a required shape and the exterior walls of the structure are conveniently folded into shape utilising a carton manufacturing technique, any joints being preferably sealed, for example by a suitable adhesive. Since the exterior walls are in this case relatively weak, the structure may be fitted into a box-like outer casing of any suitable material such as a metal which provides the exterior of the refrigerator cabinet with additional strength and support or the structure may be used to provide a refrigerator without any further casing which is suitable for fitting into a cavity in, for example, a kitchen wall so as to provide a built-in refrigerator.

Preferably the laminate forming the inner liner is thermoformed, for example by vacuum forming, in one piece into a suitable shape. It can have for example moulded-in shelf runners formed integrally with its side walls. The laminate can have an outwardly turned flange which serves to cover or partially cover the forwardly facing edges of the structural unit.

If necessary, the structure may also contain reinforcements, for example in the form of one or more metal or wooden frames, located within the space between the double walls, to give added strength, and to assist in supporting the structure against subsequent distortion. Conveniently a reinforcing member extends substantially around the access opening to the interior of the box-like structure and serves to support, by means of hinges, an openable door or lid for the cabinet.

The polyurethane foam is formed in situ in the space between the double walls; for this purpose the walls are preferably mounted within a suitably shaped jig which is arranged to support the walls against the high internal pressures developed during the foaming. The foam can be cured by heating or by microwave heating if desired. The foam bonds to the internal surfaces of the walls, during this process and secures them in the spaced relationship thereby enabling a rigid structure of high strength to be obtained.

The foamable or foaming polyurethane composition and the technique used for filling the space can be any of the conventional compositions and techiques used for filling spaces and voids in-situ. Examples of suitable compositions and techniques are described in "Rigid Plastics Foams" by T. H. Ferrigno, published by Reinhold Publishing Corp., second edition, 1967, pages 1–206.

The laminate of the invention can also be used to produce a thermally insulating panel or door comprising a polyurethane foam sandwiched between and bonded to the laminate of the invention and a layer of metal, wood, paper, cardboard or a similar material made from paper pulp, the film being bonded to the polyurethane foam.

The method of constructing the thermally insulating panel or door as defined above comprises arranging the laminate of the invention and the layer of metal, wood, paper, cardboard or the similar material made from paper pulp in a spaced-apart relationship with the film facing the layer of metal, wood, paper, cardboard or the similar material made from paper pulp, optionally supporting the laminate and the layer within a jig, introducing a foamable or foaming polyurethane composition into the space and allowing the composition to set.

When the thermally insulating panel or door has a layer of metal bonded to the foam, the metal can have decorative or wear resistant material on its external surface and when it has a layer of wood bonded to the foam, the wood can be decorated with plastic laminates on its external surface.

The layer of metal or wood preferably has an inwardly turned flange which serves to cover or partially cover the edges of the foam. When the panel or door is to have a layer of metal bonded to the foam, the metal is preferalby treated so that the polyurethane bonds to it. Suitable treatment include sand blasting, wire brushing or the application of a primer.

Unless the laminate forming one wall of the panel or the door liner is to be flat, the laminate is preferably thermoformed, for example by vacuum forming, into a sutiable shape before it is bonded to the foam. It can have for example recesses for receiving eggs and one or more shelves for holding items such as cheese or bottles. The laminate can have an outwardly turned flange which serves to cover or partially cover the edge of the foam.

If necessary, the panel or door can also contain reinforcements, for example in the form of one or more metal or wooden frames, located within the space between the spaced-apart walls to give added strength and to assist in supporting the structure against subsequent distortion.

The polyurethane foam is formed in situ in the space between the spaced-apart walls; for this purpose the walls are preferably mounted with a suitably shaped jig which is arranged to support the walls against the high internal pressures developed during the foaming. We prefer to hold the plane of the walls horizontal while the foamable or foaming polyurethane composition is introduced into the space and the composition is allowed to set. The composition can be cured by heating or by microwave heating if desired. The foam bonds to the internal surfaces of the walls during this process and secures them in the spaced relationship thereby enabling a rigid structure of high strength to be obtained.

The foamable or foaming polyurethane composition and technique used for filling the space can be any of the conventional compositions and techniques used for filling spaces and voids in situ. Examples of suitable compositions and techniques are described in "Rigid Plastics Foams" as mentioned above.

The laminate of the invention can be used to form other laminates which form a further feature of the invention.

Thus a laminate which comprises a film of a rubber-modified copolymer of styrene and acrylonitrile sandwiched between and bonded to a sheet of rubber-modified polystyrene and a sheet of a polyurethane foam can be produced by a process which comprises contacting the surface of the laminate of the invention that is of a rubber-modified copolymer of styrene and acrylonitrile with a foamable or foaming polyurethane composition and allowing the composition to set.

Thus the preferred method of producing such a foamed laminate comprises moving the laminate of the invention longitudinally with the film of the copolymer uppermost, pouring or spraying a foamable or foaming polyurethane composition onto the laminate and moving the laminate away from the position at which the composition is poured or sprayed onto it. The laminate can be supported on a rigid base, on a conveyor or between two rollers whilst the polyurethane composition is poured onto it and is setting.

The apparatus described in U.S. Pat. No. 3,475,522 can be used to produce such a foamed laminate.

Another laminate which can be produced from the laminate of the invention is a laminate which comprises a sheet of a rubber-modified polystyrene sandwiched between a film of a rubber-modified copolymer of styrene and acrylonitrile and a film of biaxially oriented polystyrene or mono-oriented polystyrene. Such a laminate is thermoformable for example for refrigerator liners where a glossy interior surface is desirable. The layer of biaxially oriented or mono-oriented polystyrene is preferably from 25 to 50 microns thick.

This laminate is preferably made by bringing the sheet and the films into contact and subjecting them to heat and pressure. The conditions of heat and pressure described for the production of the laminate of the invention are suitable. The temperature of the film of biaxially oriented or mono-oriented polystyrene is preferably at from 90° to 100°C., just before the layers are laminated. A very suitable biaxially oriented polystyrene film suitable for the production of these laminates is the film know as POLYFLEX (Registered Trade Mark). This film my be preprinted prior to lamination to provide a variety of decorative effects e.g., wood grain, marble or abstract designs.

One or more of the layers of the laminates of the invention can contain conventional additives such as flame-retardants, dyes, fillers, U.V. absorbers, antioxidants and reinforcing fibres.

Since the rubber-modified copolymers of styrene and acrylonitrile are resistant to the action of halogenated aliphatic and cycloaliphatic hydrocarbons, they can be used as the blowing agent in the polyurethane foamable or foaming composition for use in the production of the refrigerator cabinets and doors, thermally insulating panels and polyurethane foam laminates that form part of the invention.

Examples of halogenated aliphatic and cycloaliphatic hydrocarbon blowing agents include saturated aliphatic or cycloaliphatic compounds having at least one fluorine-to-carbon covalent bond and wherein the number of fluorine atoms preferably exceeds the number of carbon atoms. Preferably the saturated aliphatic and cycloaliphatic compounds are, respectively, perhaloalkanes and perhalocyloalkanes in which at least 50 percent of the halogen atoms are fluorine. These blowing agents are preferably free from nitrogen atoms, carbon-to-carbon double bonds and reactive functional groups. Specific examples of blowing agents include perfluorocyclobutane, sym-dichlorotetrafluoroethane, perfluoro-1,3-dimethylcyclobutane, perfluorodimethylcyclobutane mixtures, 1,1,2-trichloro-1,2,2-trifluoroethane, dichlorofluoromethane, 1,1-difluoroethane, sym-dibromotetrafluoroethane, trichlorofluoromethane, chlorotrifluoromethane, and dichlorodifluoromethane. Mixtures of two or more blowing agents can often be used to advantage. The blowing agents sold under the name Freon are suitable.

Embodiments of the present invention will now be described with reference to the accompanying drawings in which.

Figure 1:
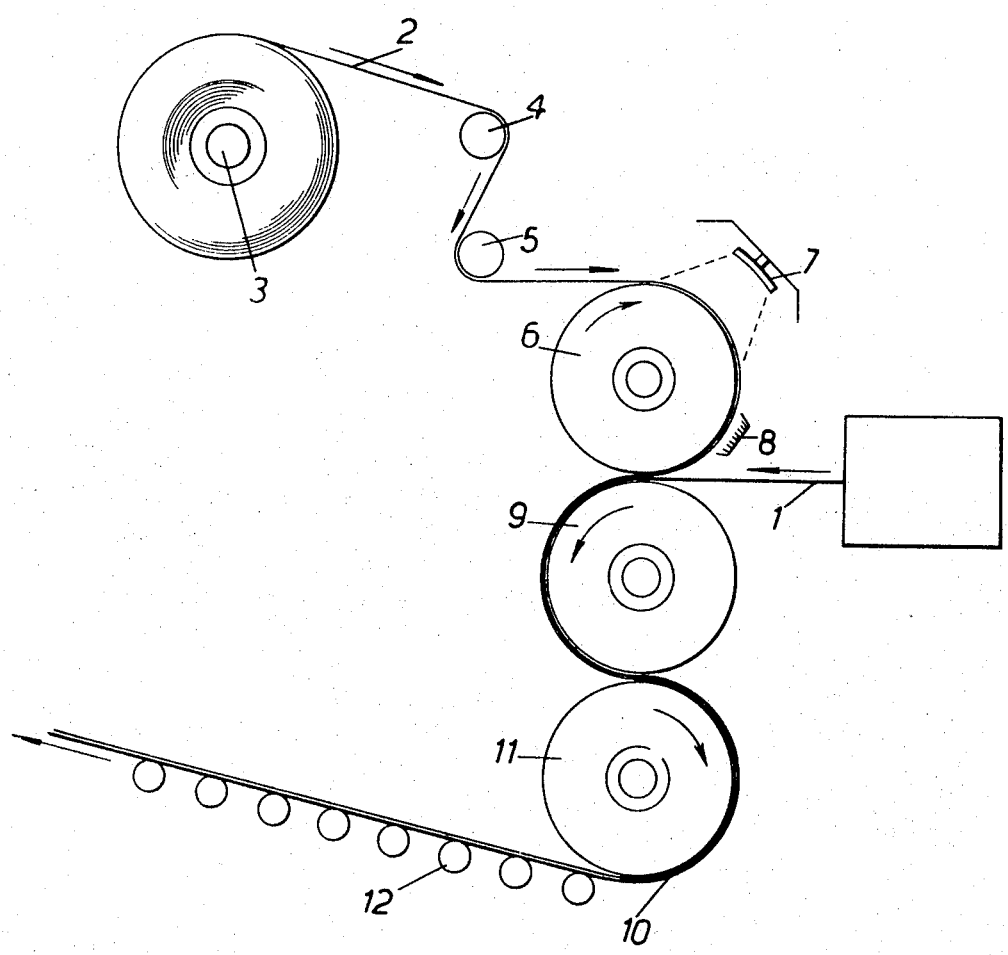
FIGS. 1 and 2 are diagrammatic sketches illustrating forms of equipment suitable for the production of the laminates of the invention.

With reference to FIG. 1 a rubber-modified styrene is extruded through a slot die maintained at from 200° to 310°C. mounted on the forward end of an extrusion machine (not shown) to produce sheet 1.

A film of rubber-modified copolymer of styrene and acrylonitrile is passed from roll 3, over smoothing rollers 4 and 5 and over roller 6. Roller 6 is uniformly heated to a temperature of from 90° to 105°C. The film 2 is heated on one side by the roller 6 and on the other side if necessary by an infra-red heater 7, subjected to a corona discharge emitted from electrode 8 and bonded in the nip of rollers 6 and 9 to sheet 1 the surface of which has cooled to a temperature of from 130° to 160°C. in passing from the extruder. The rollers 6 and 9 exert a pressure of from 1 to 10 pounds per square inch. The rollers 6 and 9 are of equal diameter and their peripheral speeds were both from 18 and 28 cm. per second. The laminate 10 is then cooled as it passes round roller 9 which is maintained at from 60° to 80°C. and round roller 11 which is maintained at from 35° to 60°C. and is then passed to the conveyor 12 where it is cut into lengths. The film 2 and the laminate 10 are in contact with rollers 6 and 9 respectively for from 6 to 14 seconds.

Figure 2:
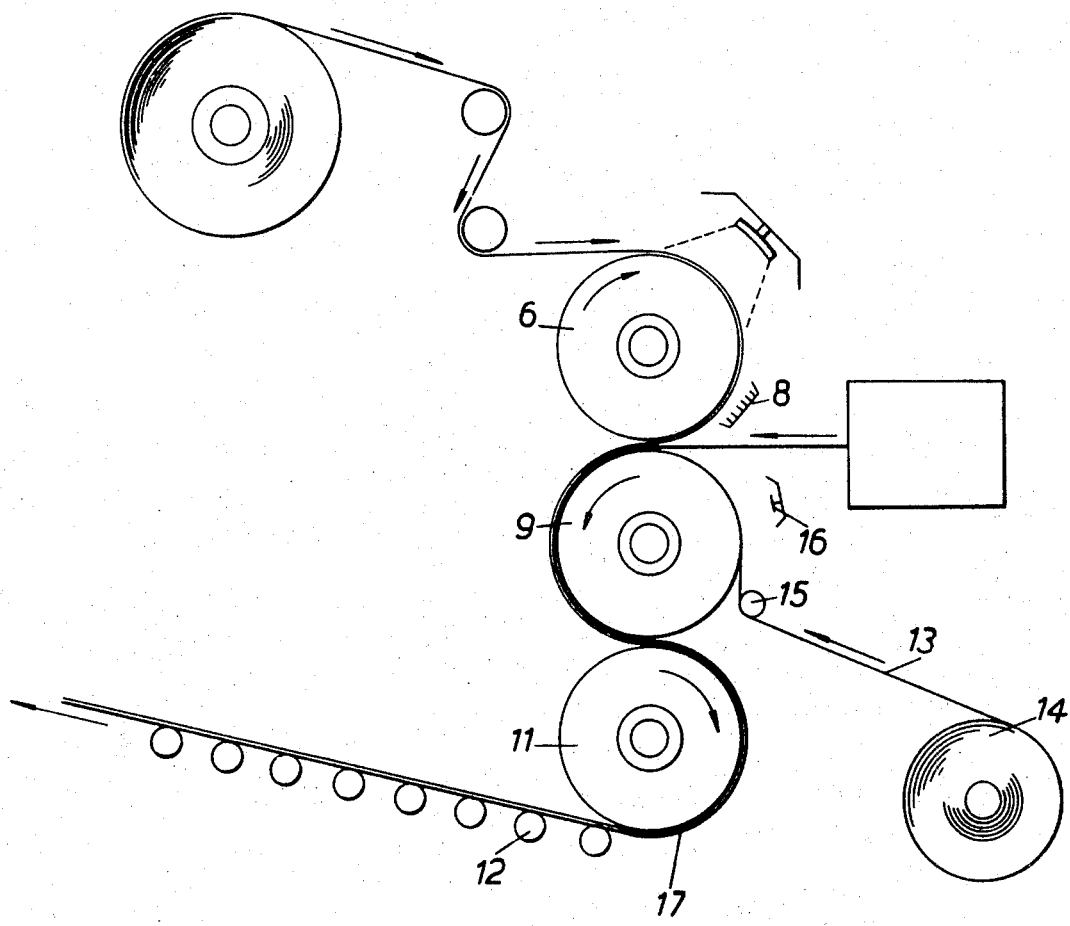

With reference to FIG. 2 the apparatus, temperatures, pressures, times, speeds and materials are the same as described with reference to FIG. 1 but a film 13 of biaxially oriented polystyrene or mono-oriented polystyrene passes from roll 14 over roller 15 and onto roller 9 which is maintained at from 80° to 105°C. instead of from 60° to 80°C. The film 13 is heated on one side by the roller 9 and on the other side to from 90° to 105°C. by infra-red heater 16 and bonded in the nip of rollers 6 and 9 to produce a three layer laminate 17 which passes to the conveyor 12 where it is cut into lengths.

Figure 3:
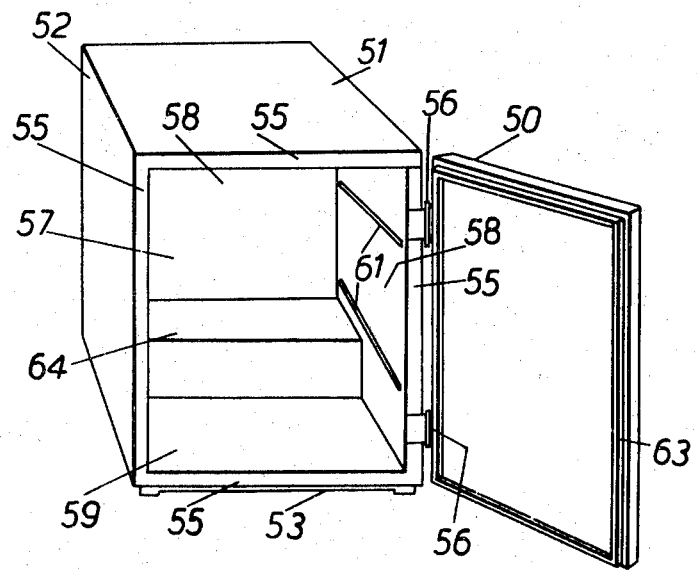
FIG. 3 is a perspective view of a refrigerator cabinet of the invention.
Figure 4:
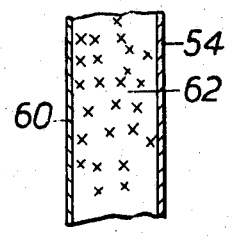
FIG. 4 is an enlarged section through part of the cabinet.

With reference to FIG. 3 the cabinet comprises a thermally insulating structure in the form of a box having an opening and a door 50 hinged to one side of the opening. The exterior of the cabinet which comprises a top 51, 3 walls 52 and a base 53, made of enamelled steel 54, has an inwardly turned flange 55 a portion of which supports hinges 56.

The inner liner 57 of the box which comprises a top, 3 walls 58 and a base 59 spaced from the exterior of the cabinet is made of the laminate of the invention 60 with the film facing the exterior of the cabinet. The inner liner 57 is thermoformed in one piece by vacuum forming and has shelf runners 61 formed integrally with its side walls.

The exterior of the cabinet and the inner liner 57 are bonded to polyurethane foam 62 which fills the space between them.

The door is mounted on hinges 56 and is provided with a resilient gasket 63 incorporating magnets designed to cooperate with the steel of the exterior of the cabinet to hold the door in the closed position.

In order to form the structure, the inner liner 57 is placed inside the exterior walls and the liner and the walls are supported in a spaced-apart position in a jig having members shaped to fit closely against the inner liner 57 and the exterior walls and a polyurethane foaming composition is introduced, through a hole approximately 2.5 cm. in diameter suitably positioned in the exterior walls, into the space between the walls so as to completely fill the space with foamed polyurethane which bonds to the internal surfaces of the walls.

Following the foaming process the structure is removed from the jig, any foam which has escaped through the filling hole during the process is removed, the exposed surface of the foam being sealed by a moisture impervious patch and the door is secured in position.

The cabinet is completed by the addition of suitable shelves, supported by the runners 61 and an evaporator (not shown) subsequently fitted into the cabinet the latter being connected to a compressor mounted exteriorly of the lining, for example beneath the step 64 in accordance with known techniques.

The invention is illustrated by the following Examples.

EXAMPLE 1

Using the apparatus illustrated in FIG. 1, a rubber-modified polystyrene having the composition 3.34 percent by weight of units derived from butadiene and 96.66 percent by weight of units derived from styrene was extruded from a slot extruder maintained at a temperature of 200°C., to produce a sheet 1 having a thickness of 5000 microns. The sheet 1 was drawn over roller 9 which had a temperature of 70°C., positioned about 90 cm. from the extruder. A film of biaxially oriented ABS 2 having a composition of 10.6 percent by weight of units derived from butadiene, 22.3 percent by weight of units derived from acrylonitrile and 67.1 percent by weight of units derived from styrene and a thickness of 50 microns was run off roll 3 over the smoothing rollers 4 and 5 and over roller 6 which was maintained at 98°C. The sheet 2 was heated by the infra red heater 7 and subjected to a corona discharge emitted from electrode 8, placed approximately 1 mm. from the sheet. The electrode 8 and the roller 6 were connected to the secondary terminals of a transformer supplying 10,000 volts AC at 3 kilocycles per second. The rollers 6 and 9 rotated at constant peripheral speed of 23 cm. per second and the sheets 1 and 2 were bonded under a pressure of 5 pounds per square inch. The surface of sheet 1 had cooled to 135°C. in passing from the extruder to the nip of the rollers. The film 2 and the laminate 10 were in contact with rollers 6 and 9 respectively for 10 seconds.

The resulting laminate 10 was found to be indestructibly bonded and to have a thickness of 5 mm. The resulting laminate can be vacuum formed and is suitable for the construction of refrigerator liners and doors.

EXAMPLE 2

The procedure of Example 1 was repeated with the electrode 8 removed and using a sheet of biaxially oriented ABS with the same composition as Example 1 but which had been subjected to a corona discharge from an electrode placed about 1 mm from the sheet and supplied with 10,000 volts AC at 3 kilocycles per second one week before the lamination. The sheet passed the electrode at 50 cm. per second.

The resulting laminate was found to be indestructubly bonded.

EXAMPLE 3

Using the apparatus illustrated in FIG. 2, the procedure, materials, temperatures, pressures, times and speeds were the same as described in Example 1 except that a film of biaxially oriented polystyrene sold under the name POLYFLEX 50 microns thick was passed from roll 14 over roller 15 and onto roller 9 which is maintained at from 80° to 105°C. instead of 70°C as in Example 1. The sheet was heated on one side by the roller 9 and on the other side to from 90° to 105°C. by the infra-red heater 16 and bonded in the nip of rollers 6 and 9 to produce a 3 layer laminate 17 which was passed to the conveyor 12 where it was cut into lengths.

EXAMPLE 4

The procedure of Example 3 was repeated with the electrode 8 removed and using a sheet of biaxially oriented ABS with the same composition as in Example 3 but which had been subjected to a corona discharge from an electrode placed about 1 mm. from the sheet and supplied with 10,000 volts AC at 3 kilocycles per second one week before the lamination. The sheet passed the electrode at 50 cm. per second.

The resulting laminate was found to be indestructibly bonded.

What is claimed is:

1. A laminate comprising a biaxially oriented film of a rubber-modified copolymer of styrene and acrylonitrile sandwiched between and bonded to a sheet of rubber-modified polystyrene which includes from 2 to 20 weight percent rubber therein, and a sheet of polyurethane foam.

2. The laminate claim 1 wherein the orientation level of the biaxially oriented film is between 25 to 550 lbs. per sqaure inch in both the longitudinal and transverse directions.

* * * * *